(12) United States Patent
Waldmann et al.

(10) Patent No.: US 9,869,578 B2
(45) Date of Patent: Jan. 16, 2018

(54) MAGNETIC STIRRER WITH MOUNTING FEET

(75) Inventors: Dirk Waldmann, Buggingen (DE); Erhard Eble, Bad Krozingen (DE)

(73) Assignee: IKA-Werke GmbH & Co. KG, Staufen (DE)

( * ) Notice: Subject to any disclaimer, the term of this patent is extended or adjusted under 35 U.S.C. 154(b) by 1071 days.

(21) Appl. No.: 12/999,786

(22) PCT Filed: May 5, 2009

(86) PCT No.: PCT/EP2009/003194
§ 371 (c)(1),
(2), (4) Date: Dec. 17, 2010

(87) PCT Pub. No.: WO2009/156020
PCT Pub. Date: Dec. 30, 2009

(65) Prior Publication Data
US 2011/0103175 A1    May 5, 2011

(30) Foreign Application Priority Data

Jun. 24, 2008   (DE) .................. 10 2008 029 901

(51) Int. Cl.
*B01F 15/04*   (2006.01)
*G01G 23/10*   (2006.01)
(Continued)

(52) U.S. Cl.
CPC ............... *G01G 23/00* (2013.01); *G01G 3/14* (2013.01); *G01G 21/283* (2013.01); *G01G 23/3721* (2013.01)

(58) Field of Classification Search
CPC ...... A01K 5/0216; A47J 43/0465; B01F 3/18; B01F 7/16; B01F 11/0082; B01F 15/04;
(Continued)

(56) References Cited

U.S. PATENT DOCUMENTS 4,479,562 A * 10/1984 Mairot ................. G01G 3/1402
177/256
4,497,386 A * 2/1985 Meier ...................... G01G 3/16
177/154
(Continued)

FOREIGN PATENT DOCUMENTS

CN       2088240 U  * 11/1991  ............. G01G 19/46
DE       3248455       7/1984
(Continued)

OTHER PUBLICATIONS

JP03243830 Yamumara et al.—Magnetic Stirrer Built-In Type Electronic Balance [Translation; Oct. 30, 1991; 13 pages].*
(Continued)

*Primary Examiner* — Dirk Bass
*Assistant Examiner* — Hayden Brewster
(74) *Attorney, Agent, or Firm* — Volpe and Koenig, P.C.

(57) ABSTRACT

A magnetic stirrer (1) has a housing (2) for accommodating a drive (3) and a holder or mounting plate (5) for a stirred vessel and a stirring magnet. A plurality of mounting feet (6) are provided for mounting the magnetic stirrer (1) on the base, which mounting feet are mounted in a movable or flexible manner and are connected to a weight measuring device or sensors belonging to a weight measuring device, with the result that the weight of the stirred material or a change in weight can be determined at any time without complicated additional weighing operations.

9 Claims, 4 Drawing Sheets

(51) Int. Cl.
*G01G 23/00* (2006.01)
*G01G 3/14* (2006.01)
*G01G 21/28* (2006.01)
*G01G 23/37* (2006.01)
G01G 21/00 (2006.01)
G01G 1/00 (2006.01)

(58) Field of Classification Search
CPC ............. B01F 15/0445; B01F 13/1055; B01F 13/0809; B01F 13/0818; B01F 13/0827; B01F 13/0872; B01F 15/00688; B01F 2215/0008; F16C 32/0438; G01G 1/00; G01G 1/18; G01G 1/22; G01G 1/24; G01G 1/26
USPC ....... 177/185, 187, 188, 195, 212, 239, 243, 177/245, 256; 366/141, 273, 274
See application file for complete search history.

(56) References Cited

U.S. PATENT DOCUMENTS

| 4,881,607 | A | * | 11/1989 | Backu ............................ 177/256 |
| 4,991,973 | A | * | 2/1991 | Maaz et al. .................... 366/141 |
| 5,694,341 | A | * | 12/1997 | Song, II ......................... 702/173 |
| 5,708,236 | A | * | 1/1998 | Shaanan ................ G01G 19/44 177/211 |
| 5,894,112 | A | * | 4/1999 | Kroll ...................... G01G 19/07 177/134 |
| 7,423,225 | B1 | * | 9/2008 | Kroll ...................... G01G 21/22 177/132 |
| 2002/0074170 | A1 | | 6/2002 | Oldendorf et al. |
| 2002/0134593 | A1 | * | 9/2002 | Lee ................. 177/245 |
| 2003/0089531 | A1 | * | 5/2003 | Montagnino .......... G01G 21/22 177/238 |
| 2004/0084227 | A1 | * | 5/2004 | Germanton ............ G01G 19/44 177/239 |
| 2004/0129463 | A1 | * | 7/2004 | Carlucci et al. ............... 177/262 |
| 2007/0041871 | A1 | * | 2/2007 | Lecrone .......................... 422/61 |
| 2009/0152021 | A1 | * | 6/2009 | Tamborini .................... 177/262 |

FOREIGN PATENT DOCUMENTS

| DE | 8906487 | 8/1989 |
| DE | 4201693 | 4/1993 |
| DE | 10122274 | 6/2003 |
| EP | 0332213 | 9/1989 |
| JP | 03243830 | 10/1991 |
| WO | 2004097349 | 11/2004 |

OTHER PUBLICATIONS

Vernier Stir Station User Manual [downloaded Jan. 22, 2015; 2 pages].*
CN2088240U Quanling—Balance for weighing persons in the bathroom and bedroom [Abstract, MT & Original; Nov. 6, 1991; 16 pages].*

* cited by examiner

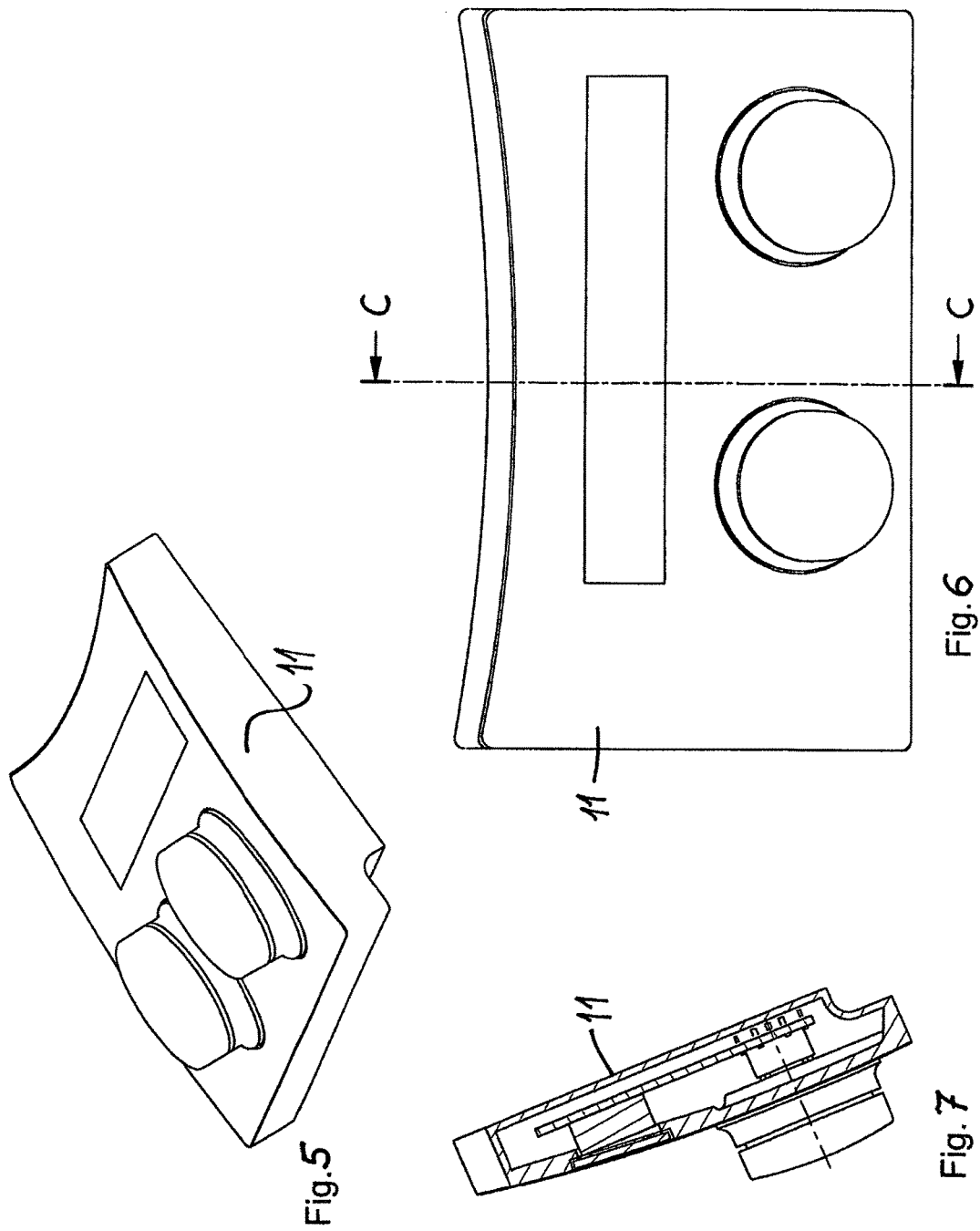

MAGNETIC STIRRER WITH MOUNTING FEET

BACKGROUND

The invention relates to a magnetic stirrer with a weight measuring device and with a base or housing in which an electrical stirring drive is arranged in the form of a rotating magnet or in the form of coils that can be excited in an alternating manner, wherein an upper holder or mounting plate for a vessel is provided for holding the material to be stirred and a stirring magnet and several mounting feet are provided on the bottom side on the base or housing for setting on a platform.

Magnetic stirrers without weighing devices are known, for example, from DE 101 22 274 C2 or from DE 32 48 455 A1 and have been proven.

For the production of a certain mixture, a user of such a magnetic stirrer must bring together the individual components of this mixture in a correctly dosed ratio in the stirring vessel, after which the mixing process must be performed.

If the production of the mixture, however, requires a gradual addition or dosing of one or more components, in particular, if the mounting plate of the magnetic stirrer can be heated and certain heating programs are to be performed, then repeated processes for weighing and filling the material added during the stirring process must always be performed.

Furthermore, primarily in the case of simultaneous heating, the mixture result could also be falsified by evaporation processes.

From DE 89 06 487 U1, a top-pan electronic scale is known, with the drive means for a magnetic stirrer being integrated in its scale pan. This makes it necessary to provide, in the interior of the device, insulating rubber buffers that carry the scale pan with similarly insulating objects. This arrangement in the interior of the overall device means a corresponding expense for the production and the assembly. Mounting feet are not provided on the bottom side of this scale.

SUMMARY

Therefore, the object arises of creating a magnetic stirrer of the type noted above with which the production of a correct mixture result is simplified for the user, wherein the advantage should be maintained that mounting feet are provided on the base or housing for setting on a platform and wherein parts that are essential for the weighing device should be more easily accessible.

For meeting this objective, the magnetic stirrer defined above is characterized in that several mounting feet are supported in the position of use upward or in the vertical direction against a restoring force or spring force in a flexible or adjustable or movable way and are provided with or connected to or in active connection with a weighing device.

Therefore, it is possible in a simple way to immediately detect, preferably display, and allow a reaction to changes in weight of the magnetic stirrer and thus, above all, of the material being mixed during the stirring process or also during the filling or mounting of the stirring vessel on the magnetic stirrer. In particular, a very precise dosing of the individual mixture components can be performed when they are filled in a stirring vessel already located on the mounting plate. Furthermore, during the stirring process, additional components could be added very easily and precisely, because the change in weight created in this way is determined immediately by the weighing device of the magnetic stirrer. Advantageously, here the parts that move for the weighing process are the mounting feet that are easily accessible from the outside.

It is especially useful when a part of the moving support of the mounting feet is in active connection with the weighing device. This represents a structurally simple possibility for making the movement of the mounting feet apply a force on a scale or weighing device.

For a modified embodiment, the mounting foot or feet could consist at least partially from spring-elastic, flexible material and could be provided with a transmission element to the weighing device, with this transmission element being connected to the weighing device and being movable by the flexibility of the mounting foot or feet.

It is especially useful when all of the mounting feet are supported in a flexible or movable way and are provided with or connected to a weighing device. This produces an especially precise weighing of mixtures and mixture components.

Another modification could provide that at least two mounting feet or several or all of the mounting feet are connected mechanically to each other. Also, a corresponding weighing device could also be loaded or controlled.

The connection of two mounting feet could have a distance to a mounting face between these feet or at least two mounting feet could be joined or connected integrally to form a wide mounting foot that has or applies a force on a shared weighing device or two weighing devices. In this way the stability of the magnetic stirrer could be improved and nevertheless the weighing function could be achieved. With respect to shared magnetic stirrers with multiple individual mounting feet, however, the embodiment is preferred in which these multiple individual mounting feet each interact with the weighing measurement device or one of these devices, for example, by the use of corresponding sensors, so that existing magnetic stirrer configurations could remain essentially unchanged, but the corresponding moving or flexible mounting feet could be given a weighing function.

A preferred embodiment could provide that the flexible or adjustable or moving mounting feet apply a force on levers or rockers or end pieces that interact with or are in active connection with or connected to the weighing device or optionally include a weighing device.

The levers or rockers or end pieces movable by the mounting feet could be provided with force measurement sensors or measuring tapes or piezoelectric elements as components of a weighing device. In this way a corresponding weighing function could be implemented in a very constricted space.

It is preferred when the force measurement sensors of multiple or all of the mounting feet are combined with a microprocessor or computer such that the weight forces received at the individual mounting feet are summed and/or averaged. Thus, the user receives, in advance, weight information or total weight or its change can be displayed in a suitable way or supplied to a control device that can react to a change in weight.

One configuration of the magnetic stirrer according to the invention could provide that it has an electronic memory for compositions, wherein individual components of mixtures are stored in this memory with respect to material and weight and can be processed by the integrated weighing function with menu controls. Thus, repeating mixture processes could always be considerably streamlined and accelerated.

Another configuration could provide that an operating, control, and/or memory unit are provided and connected detachably to the base or housing of the magnetic stirrer and connected to the drive parts located in the base or housing, to the weighing device, and/or to additional assemblies via radio frequency or a cable. Thus, the user could operate the magnetic stirrer also at a large distance or could read off the various displays, which is then advantageous, for example, if the magnetic stirrer is to be operated under a protective hood, for example, in an extractor hood, and the user would nevertheless also like to execute control functions.

It could be preferred if the mounting plate for the vessel could be heated. Above all, a mounting plate that can be heated influences the material to be stirred and its weight, so that the combination of a magnetic stirrer with a mounting plate that can be heated and weighing device is especially useful.

Above all, for the combination of individual or several of the features and measures described above, a magnetic stirrer is produced in which the weight of the material to be stirred and a possible change in weight, whether it is during the stirring process or due to the addition of additional components, can be immediately detected and, if necessary, corrected or evaluated.

BRIEF DESCRIPTION OF THE DRAWINGS

Below, an embodiment of the invention is described in detail with reference to the drawings. Shown in a partially schematic diagram are.

DETAILED DESCRIPTION OF THE PREFERRED EMBODIMENTS

Figure 1:
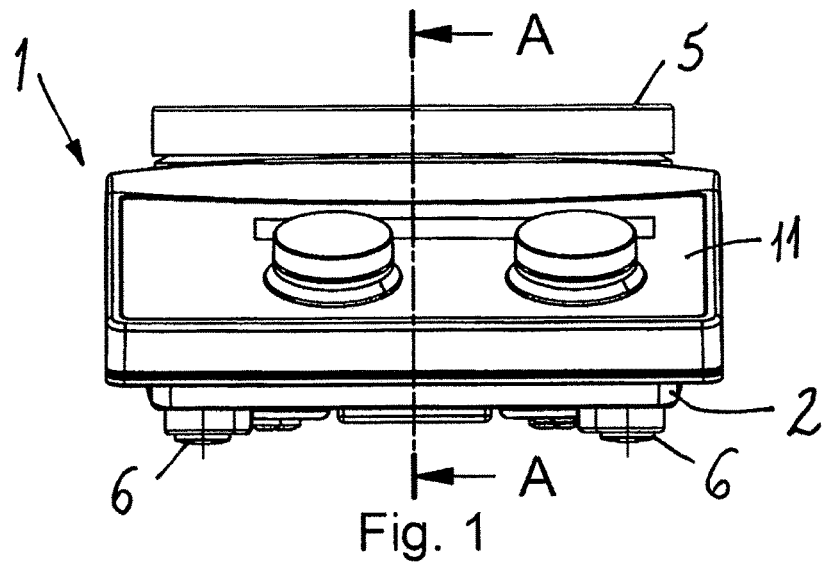
FIG. 1 a front view of a magnetic stirrer according to the invention with a view toward the removable control unit located on the housing, FIG. 2 a longitudinal section of the magnetic stirrer according to line A-A in FIG. 1, FIG. 3 a view of the bottom side of the magnetic stirrer with a view toward the total of four mounting feet provided there, FIG. 4 at a considerably enlarged scale, a longitudinal section through a mounting foot and its fastening according to section line B-B in FIG. 3, FIG. 5 in a perspective diagram, the control unit removed from the housing of the magnetic stirrer, FIG. 6 a top view of the control unit according to FIG. 5, and FIG. 7 a cross section of the control unit according to section line C-C in FIG. 6.

A magnetic stirrer designated overall with 1 typically has a frame or a housing 2, called "housing 2" below, in which an electric stirrer drive designated overall with 3 is arranged in the form of a rotary magnet 4 with associated drive motor 4a. It would also be conceivable that coils that can be excited alternately are provided as the stirrer drive 3.

An upper holder or mounting plate 5 is used for holding a vessel for the material to be stirred and for a stirring magnet that is brought into stirring movement by the rotary magnet 4.

Figure 4:
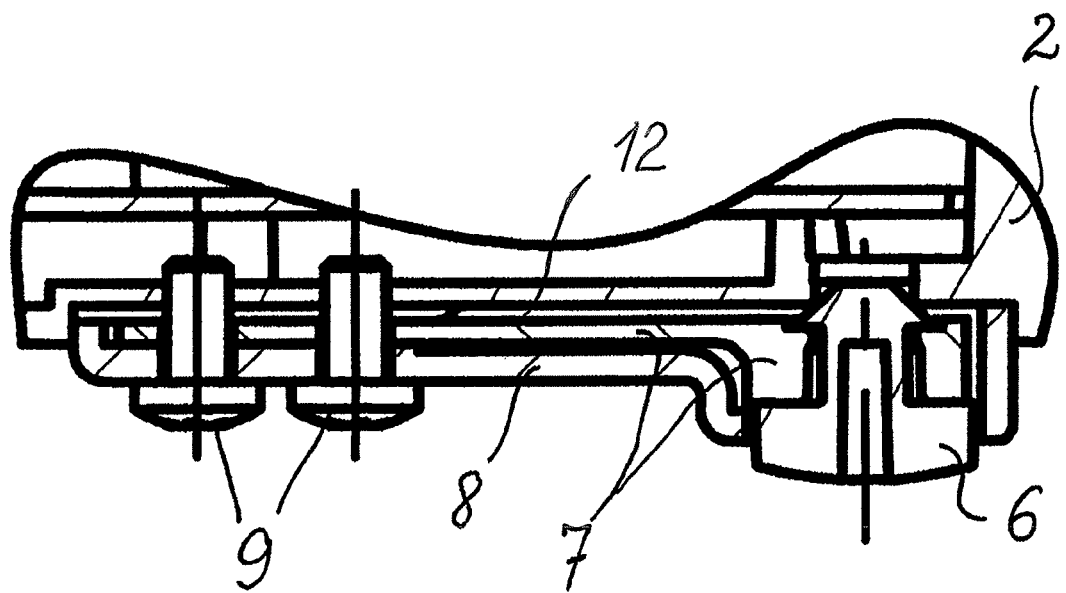

On the bottom side of the housing 2 there are several, in the illustrated embodiment, four mounting feet 6 for setting the magnetic stirrer 1 on a platform; one of these feet is shown enlarged in FIG. 4.

These mounting feet 6 are supported so that they are flexible and adjustable or movable upward or in the vertical direction against a restoring or spring force and are provided in a way still to be described with a weighing device or connected or in active connection with this weighing device, so that the weight of a stirring vessel and, in particular, of the material to be stirred can be determined and monitored. For example, one or more components could also be added during the stirring process in the relevant dosing to form a mixed material, because the resulting change in weight is immediately detected on the magnetic stirrer 1 itself.

According to FIG. 4 it is provided that a part of the moving support of the mounting feet 6 is in active connection with the weighing device, wherein the weighing device itself is not shown. Here one sees that the mounting feet 6 each load a lever 7 that is formed as a spring and that is deflected by an increase in the weight force and thus a greater displacement of the foot 6 into its support. These spring-like levers 7 movable by the mounting feet 6 could be provided with or interact with force measurement sensors or measuring tapes or piezoelectric elements not shown in more detail, with these parts being components of a weighing device. Thus, with increasing weight, the movement of the foot 6 could deform the spring-like lever 7 deeper into recesses or openings arranged at a bottom side of the housing 2 and could transfer the weight by the mentioned sensors to the weighing device.

Here, the lever 7 constructed as a spring is protected on the bottom side by a cover 8 and thus cannot be activated unintentionally. This cover 8 and the spring-like lever 7 are here fastened or tensioned on the housing 2 by two screws 9.

The force measurement sensors of all of the mounting feet 6 could here be combined in a way not shown in more detail with a microprocessor or computer, so that all of the weight force components received by the individual mounting feet 6 can be added to one overall weight.

Optionally, by use of the weighing device, a control device 10 belonging to the magnetic stirrer 1 could also be loaded, that is, the weighing result could also be included in the control of the magnetic stirrer 1.

Figure 2:
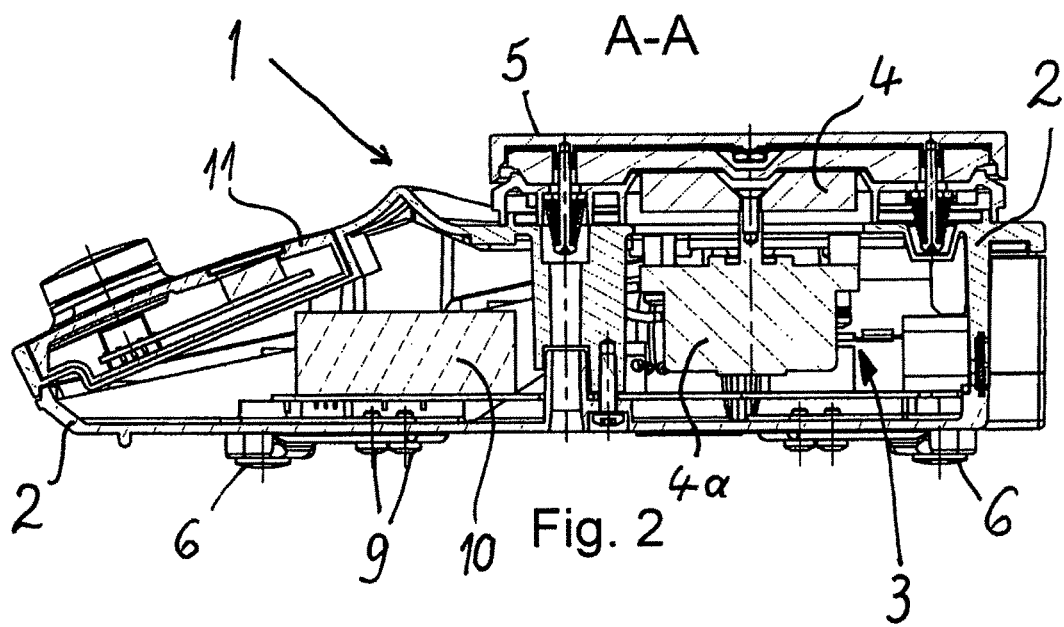
Figure 3:
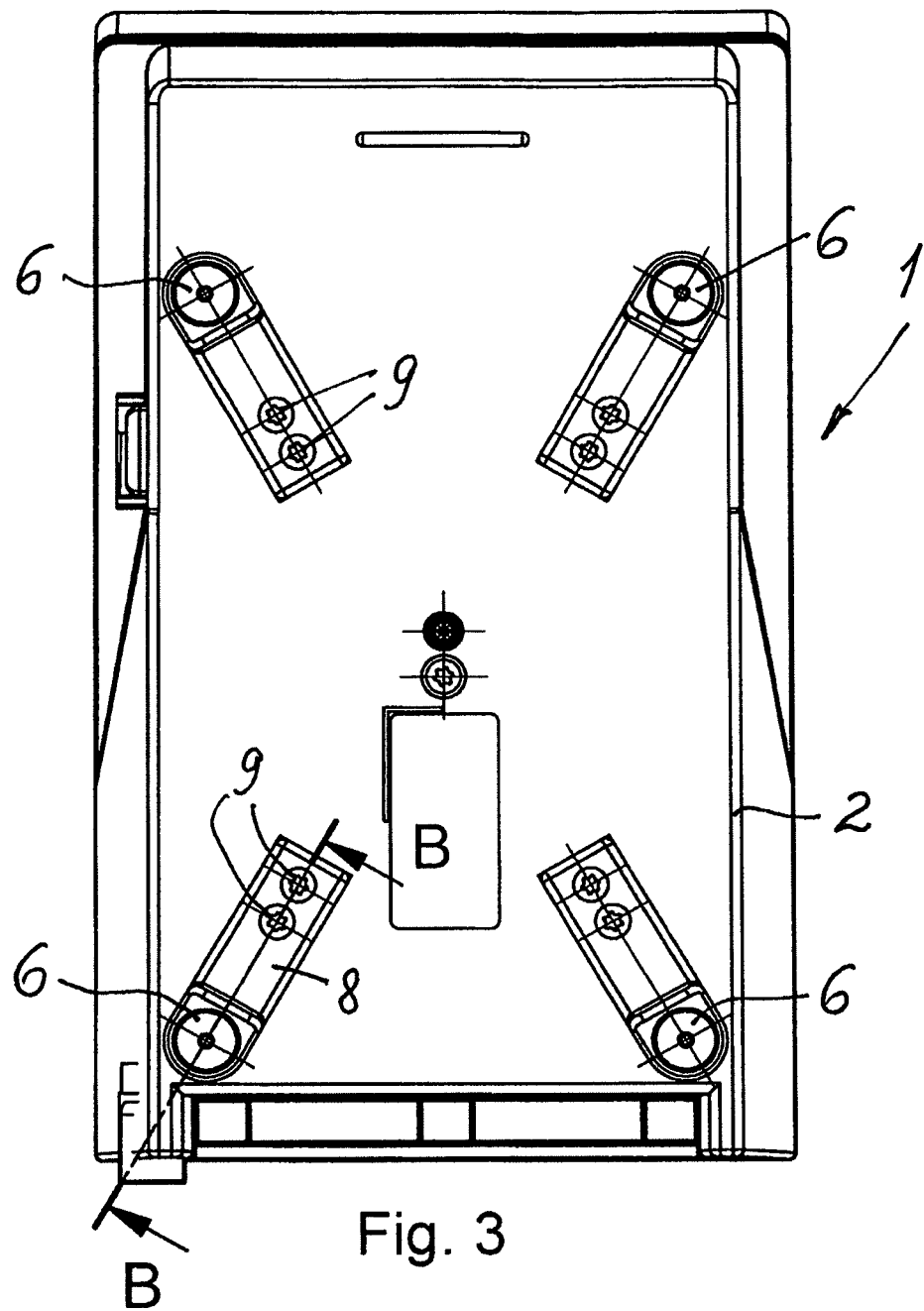

In FIGS. 5 to 7, a control unit 11 is shown separated from the housing 2 of the magnetic stirrer 1, with this unit being connected detachably to the housing 2 in FIGS. 1 and 2. This control unit that could also be a control or memory unit or comprises its functions is connected to the drive parts 3 located in the base or housing 2 of the magnetic stirrer 1, to the controller 10, to the weighing device, and/or to additional assemblies by radio frequency or by a cable, thus can be used both in the position shown in FIGS. 1 and 2 and also separated from this position by a certain distance. Thus, for example, the determined weight or a changing weight could also be detected and identified at a distance from the magnetic stirrer 1, if, namely, for example, the magnetic stirrer 1 is to be used under an extractor hood.

Both the weighing device above the moving mounting feet 6 and also the detachable control unit 11 are especially preferred, if the mounting plate 5 can be heated, because then corresponding changes in weight are to be taken into account during the stirring process and due to the heating.

The magnetic stirrer 1 has a housing 2 for holding a drive 3 and a holder or mounting plate 5 for a stirring vessel, as well as a stirring magnet. For setting the magnetic stirrer 1 on a platform, several mounting feet 6 are provided that are supported so that they are moveable or flexible and are connected to a weight measurement device or to sensors belonging to a weight measurement device, so that the weight of the material to be stirred or also a change in weight could be determined at any time without complicated additional weighing processes.

The invention claimed is:

1. Magnetic stirrer comprising a weighing device for measuring a weight and a housing in which is arranged an electrical stirring drive including a rotating magnet or coils, wherein a holder or mounting plate is provided for a vessel for holding material to be stirred and a stirring magnet, the weighing device comprises deformable spring levers, each having first and second ends, the first ends being mounted to a bottom side of the housing so that the spring levers are cantilevered, and several external mounting feet are provided on the bottom side of the housing, the mounting feet are mounted on the second ends of the spring levers so that, in operation, the mounting feet are movable upwards relative to the housing against a restoring force generated by the spring levers whereby the mounting feet deform said spring levers, and a deformation of the spring levers is indicative of the weight to be measured, the housing comprises one or more recesses or openings arranged at the bottom side of the housing, and the mounting feet are at least in part moveable into the recesses or openings by application of the weight to be measured.

2. Magnetic stirrer according to claim 1, wherein a support of the mounting feet on the housing is in active connection with the weighing device.

3. Magnetic stirrer according to claim 1, wherein the mounting feet are provided with a transmission element to the weighing device, with the transmission element being connected to the weighing device and movable by the mounting feet.

4. Magnetic stirrer according to claim 1, wherein all of the mounting feet are mounted in a flexible or movable way and are provided with or connected to the weighing device.

5. Magnetic stirrer according to claim 1, wherein the levers are provided with force measurement sensors as components of the weighing device.

6. Magnetic stirrer according to claim 5, wherein the force measurement sensors of several or all of the mounting feet are combined using a microprocessor or computer such that weight forces recorded on individual ones of the mounting feet are summed or averaged.

7. Magnetic stirrer according to claim 1, wherein the stirrer has an electronic memory configured to store individual compositions of mixtures defined with respect to material and weight to be processed by an integrated weighing function with menu controls.

8. Magnetic stirrer according to claim 1, wherein an operating, control, or memory unit is provided and connected detachably to the base or housing and is connected by radio frequency or by a cable to at least one of: drive parts located in the base or housing, the weighing device, or additional assemblies.

9. Magnetic stirrer according to claim 1, wherein the mounting plate for the vessel is heated.

* * * * *